United States Patent [19]
Gabaldon et al.

[11] Patent Number: 5,398,265
[45] Date of Patent: Mar. 14, 1995

[54] COMPUTER SUBSYSTEM RESET BY ADDRESS DEPENDENT RC DISCHARGE

[75] Inventors: John B. Gabaldon, San Diego; Daniel D. Evans, Jr., Oceanside, both of Calif.

[73] Assignee: Hughes Aircraft Company, Los Angeles, Calif.

[21] Appl. No.: 243,052

[22] Filed: May 16, 1994

Related U.S. Application Data

[63] Continuation of Ser. No. 610,727, Nov. 8, 1990, abandoned, which is a continuation of Ser. No. 269,931, Nov. 10, 1988, abandoned.

[51] Int. Cl.6 .............................................. G06F 1/24
[52] U.S. Cl. ..................... 395/275; 364/259.9; 364/280.2; 364/280.3; 364/DIG. 1; 395/575; 371/12
[58] Field of Search ............... 395/700, 575, 275, 800; 371/12

[56] References Cited

U.S. PATENT DOCUMENTS

| | | | |
|---|---|---|---|
| 3,654,448 | 4/1972 | Hitt | 235/153 |
| 4,028,683 | 6/1977 | Divine et al. | 364/900 |
| 4,040,029 | 8/1977 | Young | 364/900 |
| 4,047,158 | 9/1977 | Jennings | 364/900 |
| 4,308,615 | 12/1981 | Koegel | 364/900 |
| 4,328,558 | 5/1982 | Musa | 364/900 |
| 4,386,400 | 5/1983 | Cope | 364/200 |
| 4,396,984 | 8/1983 | Videki | 364/200 |
| 4,410,942 | 10/1983 | Milligan | 364/200 |
| 4,434,403 | 2/1984 | Chang | 328/120 |
| 4,500,956 | 2/1985 | Leininger | 364/200 |
| 4,513,417 | 4/1985 | Lamb et al. | 371/12 |
| 4,538,265 | 8/1985 | Day et al. | 371/12 |
| 4,549,168 | 10/1985 | Sieradzki | 340/518 |
| 4,553,204 | 11/1985 | Hashimoto | 371/12 |
| 4,556,882 | 12/1985 | Brifman | 340/825.06 |
| 4,556,938 | 12/1985 | Parker | 364/200 |
| 4,566,103 | 1/1986 | Sato et al. | 371/12 |
| 4,573,120 | 2/1986 | Ichimiya | 395/275 |
| 4,625,312 | 11/1986 | Bashaw | 371/16.1 |
| 4,644,494 | 2/1987 | Muller | 364/900 |
| 4,654,821 | 3/1987 | Lapp | 364/900 |
| 4,674,035 | 6/1987 | Engel | 364/200 |
| 4,748,573 | 5/1988 | Sarandrea | 364/900 |
| 4,761,762 | 8/1988 | Holmes | 364/900 |
| 4,821,182 | 4/1989 | Leininger | 364/900 |
| 4,964,123 | 10/1990 | Umemoto | 371/12 |
| 5,283,889 | 2/1994 | DeLisle | 395/500 |
| 5,307,464 | 4/1994 | Akao | 395/275 |

*Primary Examiner*—Eric Coleman
*Attorney, Agent, or Firm*—Georgann S. Grunebach; Terje Gudmestad; W. K. Denson-Low

[57] ABSTRACT

In a system wherein a system master (11) communicates with a plurality of subsystems (13, 25, 27, 29), each subsystem (13, 25, 27, 29) is associated with a unique reset address and a reset circuit which recognizes that reset address and generates a reset signal. Each reset circuit includes an address decoder (15) for decoding the reset address to produce a signal which closes a logic gate switch (19). The logic gate switch (19) is repeatedly closed in response to repeated assertions of the address to successively discharge the voltage on a capacitor (C). When the capacitor voltage is discharged to a selected level, a buffer level detector circuit (23) generates the reset signal.

5 Claims, 1 Drawing Sheet

COMPUTER SUBSYSTEM RESET BY ADDRESS DEPENDENT RC DISCHARGE

This is a continuation of application Ser. No. 610,727, filed Nov. 8, 1990, now abandoned which was a continuation of application Ser. No. 269,931, filed Nov. 10, 1988 now abandoned.

BACKGROUND OF THE INVENTION

1. Field of the Invention

The subject invention relates generally to computer systems, and more particularly to a method of resetting subsystems connected to a system master computer in response to error conditions, using address dependent RC discharge circuitry.

2. Description of Related Art

Most computer systems and subsystems rely on a power up reset, typically timed by an RC network, to begin an orderly execution of their primary tasks with well-known initial conditions. When an error condition (fault) occurs from which the system has no way of recovering, the faulty system or its faulty subsystem will completely stop execution of its primary task, or worse, begin to behave in an unpredictable manner.

There are two methods in which most systems handle such faults. According to one method, task execution is halted and an error message identifying the faulty subsystem is transmitted to the system operator. The system operator may respond by powering down the entire system and then powering it up again to allow the system master and its subsystems to restart in an orderly manner. Alternatively, the system operator may respond by manually pushing a mechanical switch located on the faulty subsystem, which discharges an RC-timing network, thus simulating a power up reset on the faulty subsystem. After resetting the faulty subsystem, the operator commands the system master to continue task execution. In the second method, the system master detects the fault condition, for example, through an error message or time-out, and communicates a reset command to the faulty subsystem. The faulty subsystem then executes the command and resets itself.

There are problems with the above recovery processes. In the first method, intervention by a human operator is needed, making the system less than fully automatic and slow to recover from a fault condition. Also, powering down the entire system forces all the subsystems to reset, which unnecessarily interrupts subsystems which are operating properly. In the second method, where the system master automatically communicates a recovery command to the faulty subsystem, the faulty subsystem may be unable to interpret the command because of the nature of the subsystem fault. Additionally, in some cases, the second method is not practical because some subsystem microprocessors cannot assert a reset signal to reset themselves and supporting circuitry to a known initial condition.

SUMMARY OF THE INVENTION

It is therefore an object of the invention to improve computer system fault recovery techniques;

It is another object of the invention to minimize system operator attention to system faults;

It is another object of the invention to permit one or more particular subsystems at fault to be automatically reset, while other properly operating subsystems continue to perform their assigned tasks; and It is another object of the invention to increase the speed of recovery of a computer system in response to subsystem faults.

According to the invention, a system master detects a subsystem fault, for example, through receipt of an error message or detection of a time-out condition, and forces only the faulty subsystem to begin an electronic and software initialization identical to a power-up reset. The other subsystems are left unaffected, still executing their tasks. The selectivity required to reset only the faulty subsystem is achieved by sending out an address signal containing an address recognized only by the faulty subsystem. The address signal is repeatedly sent to the subsystem and is used to cause a stored voltage in the subsystem to move toward a selected value. When the selected value is reached, a reset signal is generated. The preferred method is to discharge a capacitor voltage toward a reset level in response to the address signal.

BRIEF DESCRIPTION OF THE DRAWINGS

The just-summarized invention will now be described in detail in conjunction with the drawings, of which.

DETAILED DESCRIPTION OF THE PREFERRED EMBODIMENTS

Figure 1:
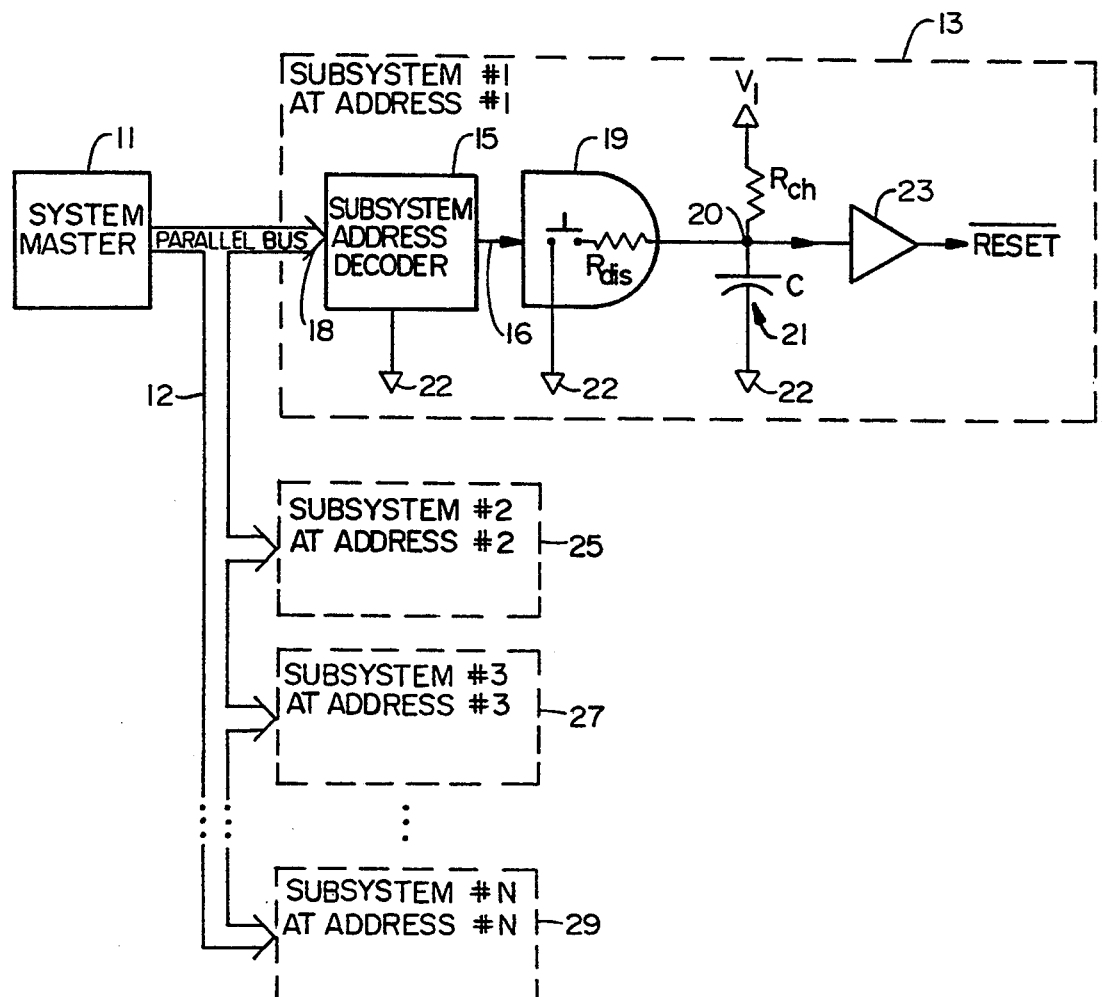
FIG. 1 is a schematic circuit diagram of the preferred embodiment.

According to the preferred embodiment of FIG. 1, a system master 11 is connected over a system address bus 12 to a number of subsystems 13, 25, 27, 29. The system master 11 and each subsystem 13, 25, 27, 29 may be, for example, conventional microprocessors. The address bus 12 provides a parallel multibit input to each subsystem 13, 25, 27, 29.

The reset circuitry of the first subsystem 13 according to the preferred embodiment is shown in detail in FIG. 1. The remaining subsystems 25, 27, 29 each include reset circuitry configured identically to that of the subsystem 13 in order to achieve reset of the respective subsystems 25, 27, 29.

The reset circuitry of the subsystem 13 includes an address decoder 15, a logic gate switch 19, a resistor $R_{ch}$, a capacitor C, and a buffer level detector integrated circuit 23. The logic gate switch 19 includes a discharge resistance, represented by $R_{dis}$.

The address decoder 15 outputs a signal over an output line 16 to the logic gate switch 19. The address decoder 15 is a conventional digital decoder, which activates the output line 16 in response to a binary reset address code received at its parallel input 18. The address decoder 15 may, and typically will, decode other addresses on the input 18 to activate other functions within the subsystem 13.

The output of the logic gate switch 19 is connected to a common node 20 between the resistor $R_{ch}$ and the capacitance C in order to discharge the capacitance C through the logic gate switch resistance $R_{dis}$. The terminal of the resistor $R_{ch}$ opposite the common node 20 is connected to a logic voltage level $V_1$, which may be, for example, 5 volts. The terminal of the capacitance C opposite the common node 20 is connected to logic ground 22. The common node 20 is additionally connected to the input of the buffer level detector 23, which outputs a reset signal RESET.

Figure 2:
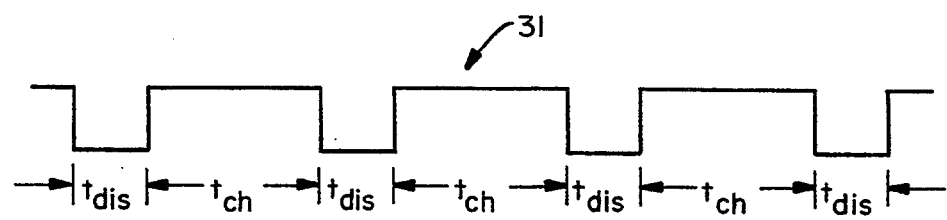
FIG. 2 is a waveform diagram illustrating an address strobe according to the preferred embodiment.

In operation of the reset circuitry of the subsystem 13, the system master 11 detects a subsystem fault through receipt of an error message or detection of a time-out, as known in the art. In response, the system master 11 places the reset address of subsystem 13 on the system address bus 12 for selected intervals $t_{dis}$, producing a strobe waveform on the output 16 of the address decoder 15, as illustrated in FIG. 2. The switch 19 is thus closed during the intervals $t_{dis}$ in which the reset address for subsystem 13 is asserted on the address bus 12. The periods $t_{dis}$ during which the switch 19 is closed represent time intervals during which the capacitor C is discharging. Each time the switch 19 is opened, represented by intervals $t_{ch}$ in FIG. 2, a recharging of the capacitor C occurs. The values of $R_{dis}$ and $R_{ch}$ are chosen such that the overall application of the strobe waveform 31 results in a net discharge of the capacitor C. The address strobe waveform 31 of FIG. 2 is applied until the capacitor C is discharged to the point where the buffer 23 interprets its input to be at a valid logic level 0, resulting in the output of the reset signal $\overline{RE\,SET}$.

The buffer level detector 23 may include a Schmitt trigger input to prevent oscillations which occur as the voltage at the common node 20 slowly transitions through its voltage range. The logic level "0" input to the buffer 23 is typically held asserted for a specified amount of time, determined by the reset requirement of the subsystem 13.

The logic gate switch 19 may be an open collector logic gate, a transistor switch, or other suitable switch. An open collector logic gate is typically used, because in most logic systems there are extra, unutilized open collector logic gates available as spares.

In overall operation of the system of FIG. 1, each individual subsystem 13, 25, 27, 29 has a unique address which is assigned to the reset command. The system master 11 may then assert each subsystem's unique reset address. The addressed subsystem 13, 25, 27, 29 decodes the address and asserts the reset signal, as discussed specifically with respect to subsystem 13. The system master 11 accesses each subsystem 13, 25, 27, 29 as it would access any device in its address range. The only difference is that the access is an address-only cycle; no data need be transferred.

In a specific embodiment, the system master 11 may be a Motorola MC6809 microprocessor operating at 1 MHz. The subsystems 13, 25, 27, 29 use addresses within the system master's address range. The subsystems 13, 25, 27, 29 may be any electronic system, including microprocessor-based computer systems. In the preferred embodiment, the subsystems 13, 25, 27, 29 are MC68020 microprocessor-based computers. The values of $R_{ch}$, $R_{dis}$, and C are 100 kohms, 6 ohms and 47 microfarads, respectively, the discharge time $t_{dis}$ is 500 nanoseconds, and the charge time $t_{ch}$ is 350 nanoseconds. Switch 19 in this embodiment may be a TTL logic gate 74S09, and the buffer integrated circuit 23 may be a TTL logic gate 74HCT14. In such an embodiment, the system master 11 successfully resets a subsystem 13, 25, 27, 29 within 1,279 address strobes.

In typical applications of the disclosed reset circuitry, the number of times the system master 11 must assert the subsystem reset address, i.e., the number of address strobes the system master 11 must issue, is a fixed number determined by the values of the RC network, the address bus cycle rate ($t_{dis}$ and $t_{ch}$), and the valid logic threshold voltage of the buffer I.C. 23. The number may be easily determined by a simple trial and error method.

A theoretical analysis of the subsystem reset circuitry may be conducted to determine the number N of strobes and the general conditions for ensuring that the capacitor C is discharging. The analysis assumes that the discharge device 19 is an ideal switch to system ground with a switch resistance of $R_{dis}$, that the buffer 23 has an infinite input impedance, and that the charging resistor $R_{ch}$ and capacitor C are ideal devices.

The general single energy storage device equation for voltage as a function of time is as follows:

$$V(t) = GV_s + (V_o - GV_s)e^{-t/Tau} \qquad (1)$$

where:
$V_s$ = Voltage input
$V_o$ = Initial voltage of the energy storage device
G = Gain (attenuation)
t = time of charge or discharge
Tau = Time Constant of RC network The discharge time for first order response is thus:

$$V(t)_{dis} = G_{dis}V_s + (V_{odis} - G_{dis}V_s)e^{-t_{dis}/Taudis} \qquad (2)$$

where:
$V_s$ = Zero in the ideal model.
$V_{odis}$ = Initial voltage on the capacitor instantaneously before the discharge cycle starts.
$G_{dis} = R_{dis}/(R_{dis} + R_{ch})$—The attenuation of the voltage at the RC node.
$t_{dis}$ = Discharge time defined by the address valid time of the address bus cycle.
$Tau_{dis} = R_{ch}R_{dis}C/(R_{dis} + R_{ch})$—Tau is determined by the total resistance and capacitance of the RC network as seen by the discharging voltage.

The charge time for first order response is:

$$V(t)_{ch} = G_{ch}V_s + (V_{och} - G_{ch}V_s)e^{-t_{ch}/Rchc} \qquad (3)$$

where:
$V_s$ = Voltage applied to charge capacitor.
$V_{och}$ = Initial voltage on capacitor instantaneously before the charge cycle starts.
$G_{ch}$ = 1—This is the attenuation to the voltage at the RC node.
$t_{ch}$ = Charge time defined typically by the address not-valid time of the address bus cycle.
$Tau_{ch} = R_{ch}C$—Tau is determined by the total resistance and capacitance of the RC network as seen by the charging voltage.

The time domain Equations (2) and (3) are only valid alternately during the discharging and charging intervals, respectively, as the switch 19 operates. This alternating lends itself to solution using the following Difference Equations (4)–(7):

$$V_{ch(k+1)} = AV_{ch(k)} + BV_s \qquad (4)$$

where:
$A = e^{-t_{ch}/Tauch}$
$B = G_{ch}(1 - A)$ $$V_{dis(k)} = V_{ch(k+1)} \qquad (5)$$

$$V_{dis(k+1)} = A'V_{dis(k)} + B'V_s \qquad (6)$$

where:
$A' = e^{-t_{dis}/Taudis}$ $$B' = G_{dis}(1-A')$$

$$V_{ch(k)} = V_{dis(k+1)} \quad (7)$$

Equations 5 through 7 are computed sequentially, with the results of one determining the input values for the next. Each iteration of Equations 5 through 7 is computed by starting at Equation "5" using the results of "7." It is important to note that the time difference between the intervals k+1 and k is different for Equations 4 and 6, but it is only the voltages at the beginning of the discharge and charge cycles which are of interest.

To find the relationships of $R_{ch}$, $R_{dis}$, C, $t_{dis}$ and $t_{ch}$ that will ensure that the capacitor C is continually discharging, Equations 4 and 6 are transformed into the z domain:

$$V_{ch}(z)/V_s(z) = B/(z-A) \quad (8)$$

$$V_{dis}(z)/V_s(z) = B'/(z-A') \quad (9)$$

The discharge response must be faster than the charge response.

Thus, $A' < A$ (10)

or $$e^{-tdis/Taudis} < e^{-tch/Tauch} \quad (11)$$

Taking the natural log of each side of Equation 11 and substituting in $R_{ch}$, $R_{dis}$, and C yields the final solution:

$$R_{dis} < N\, R_{ch} \quad (12)$$

where the number of strobes $N = t_{dis}/(t_{ch} - t_{dis})$.

In most systems $t_{dis}$ and $t_{ch}$ are fixed. It is recommended that $R_{dis}$ be chosen to be many times less than N $R_{ch}$.

The foregoing discloses a system wherein an address waveform is used to control the value of a voltage which is monitored to generate a reset signal. The address waveform provides the selectivity necessary to reset a particular subsystem while permitting other subsystems to continue operation. The address decoder 15 employed is independent of the subsystem microprocessors being reset, which means that reset can be achieved even though a microprocessor enters a fault condition from which it cannot recover.

Those skilled in the art will appreciate that various modifications and adaptations of the preferred embodiment may be made without departing from the scope and spirit of the invention. Therefore, it is to be understood that, within the scope of the appended claims, the invention may be practiced other than as specifically described herein.

What is claimed is:

1. A computer system having means for selectively resetting a particular subsystem in response to a condition of the particular subsystem, said computer system including, a system bus having a multibit address bus,
   a plurality of subsystems connected to said bus, each subsystem being addressable by said address bus, wherein each subsystem includes a subsystem address decoder and a subsystem reset circuit for generating a subsystem reset signal, said subsystem reset circuit having a distinct subsystem reset circuit address and being responsive to a first signal from said subsystem address decoder;

a system master for addressing said subsystems over said address bus, said means for selectively resetting a particular subsystem, comprising:

wherein, in response to a condition of the particular subsystem, said system master places said subsystem reset circuit address on said address bus for selected time intervals said system master operating independently of any response from said subsystem;

wherein said subsystem address decoder decodes said subsystem reset circuit address and generates said first signal containing a plurality of timing intervals;

wherein said subsystem reset circuit generates a reset signal in response to said first signal being applied for a particular number of intervals;

wherein said system master creates a waveform signal at the subsystem reset address and subsystem address decoder in response to the timing intervals created by said system master's generation of the address signal;

wherein said subsystem address decoder decodes said subsystem reset address and generates said first signal for a plurality of timing intervals and timing durations independent of a response signal to said system master for each of the plurality of timing intervals and timing durations;

wherein said system master operates independently from any response from the subsystem to validate the address bus transaction for an independent subsystem reset;

wherein said subsystem reset circuit generates a waveform signal of incrementally decreasing or increasing voltage in response to said first signal being applied for a predetermined number of intervals and a predetermined timing interval duration; and wherein said subsystem reset circuit decodes said waveform signal to cause said subsystem to reset itself in response to said first signal being applied for a predetermined number and predetermined duration of intervals.

2. The computer system of claim 1 wherein said subsystem reset circuit comprises:
   a switch for asserting a voltage in response to said first signal being applied during a timing interval;
   a resistance-capacitance discharge circuit which partially discharges in response to the voltage being asserted from the switch; and
   a detector which detects when the waveform signal shape formed by the resistance-capacitance discharge circuit achieves a predetermined waveform signal shape, wherein the reset signal is generated.

3. The computer system of claim 1 wherein said subsystem reset circuit comprises:
   means for producing a voltage at a first level;
   means for changing said voltage level and duration of said voltage level in response to said first signal being applied for a timing interval and a time duration; and
   means for generating said reset signal when said voltage waveform signal shape reaches a predetermined waveform signal shape.

4. The computer system of claim 3 wherein said first signal is a discharge and charge signal wherein said means for producing a voltage level and a voltage duration is responsive to said discharge and charge signal to change said voltage toward said predetermined waveform signal shape.

5. The computer system of claim 1 wherein said subsystem reset circuit comprises:

charge storage means for storing a voltage and responsive to said first signal to cause the level of and duration of said voltage to move toward a selected waveform signal shape; and means responsive to said voltage for producing said reset signal when said voltage a predetermined waveform signal shape.

* * * * *